United States Patent Office 3,845,232
Patented Oct. 29, 1974

3,845,232
METHOD FOR MAKING FLAKED CEREALS
Stanley H. Reesman, Battle Creek, Mich., assignor to General Foods Corporation, White Plains, N.Y.
No Drawing. Filed May 27, 1970, Ser. No. 41,098
Int. Cl. A23l 1/10
U.S. Cl. 426—457                                7 Claims

ABSTRACT OF THE DISCLOSURE

A breakfast-type cereal is produced by forming corrugated flakes of non-uniform thickness. These flakes have thin connecting membranes that dissolve in milk yielding shreds. The non-dissolving shreds essentially duplicate in eating qualities, a shredded biscuit-type cereal product.

BACKGROUND OF THE INVENTION

This invention is directed to an improved process for the production of a cereal food product that has a novel shape with textural qualities resembling a shredded biscuit cereal product. More specifically, the present invention discloses the processing of a shredded wheat flake cereal.

Numerous techniques are known in the manufacture of cereal-type breakfast foods from a wide variety of cereal grains, including corn, wheat, oat, rice and the like. Various processing steps are involved in the formation of these cereal products in different physical shapes, such as biscuits, flakes, shreds and pellets, which may or may not be cooked, puffed, and/or toasted.

A desirable form of cereal product is in a biscuit form and Hale et al., U.S. Pat. No. 2,600,532 teaches one method in the art for making biscuit-type cereals from shredded grains. The patentees disclose formation of a cooked cereal into an elongated sheet and perforation of the sheet between a smooth roll and a corrugated roll. The indented and perforated sheets are superimposed upon one another, slit, and heat puffed into a hollow body. The formed biscuit is toasted, cooled and packaged.

The present invention is considered to be an improvement over the method of Hale et al. in forming a product with similar flavor and textural qualities. However, a shredded biscuit shape with its disadvantages in complexity in processing steps is avoided. Additionally, detraction in the appearance of the biscuits may result, since breakage results in packaging and storage. In contrast, with a flake form of cereal of the present invention, no deterioration in appearance results in normal handling prior to consumer use.

It is a purpose of this invention to produce a cooked, flaked ready-to-eat breakfast-type cereal product.

It is a purpose of this invention to produce a corrugated flake of nonuniform thickness wherein portions dissolve in the presence of a liquid, such as milk, to produce a shredded product.

It is a further purpose of this invention to produce a cereal in flake form which has flavor and textural qualities similar to biscuit shape when eaten with milk.

SUMMARY OF THE INVENTION

The present invention is directed to the production of curled, corrugated flakes that have similar textural and flavor qualities as prior art breakfast cereal products in biscuit form. In the technique of this disclosure, a cooked cereal such as wheat is shredded into crinkled flakes, having alternating thick and thin portions. Either a cereal as wheat is cooked and then pelletized, or these operations may be reversed prior to shredding. The pellet is shredded into a flake by particular sets of shredding rolls. At least one of the rolls must employ a rippled surface. The other roll, while preferably smooth, may also be rippled. The cereal pellet pressed between the two rolls assumes a corrugated, curled shape of uneven thickness. These flakes are then toasted by heating which results in a curled, crinkled flake which has controlled textural properties differing from shredded flakes without corrugation.

DETAILED DESCRIPTION OF THE INVENTION

The technique of manufacture of this disclosure has the concept of producing a flake form of cereal product that in textural and eating qualities closely resembles a shredded biscuit form of the cereal. It is not the purpose of this disclosure method to merely change a flake form of a cereal from a flat or curled flake to a corrugated or crinkled flake. In other words, a difference in design per se is not the purpose of making the corrugated flake employing specific processing conditions in manufacture. Rather, the purpose of making the disclosed product is to produce a breakfast-type cereal that closely resembles a biscuit in textural and eating qualities without disadvantages of such biscuit product. The present product, while resembling a prior art flaked product in appearance, more closely resembles a biscuit in characteristics other than appearance. It is well recognized that a cereal biscuit, particularly wheat, has entirely different taste properties than its flake form.

In the invention, it is necessary to form a wheat source, such as flour or berry, into a pellet prior to shredding. The wheat is cooked and such cooking may take place either before or after pelletizing. Cooking is customarily undertaken by steaming the cereal in a pressure cooker at elevated pressures such as 5 to 30 p.s.i.g. The shaping technique of pelletizing is well known in the art and refers to extrusion of the cereal dough as through a conventional, commercial pelletizing machine.

As an optional step that is preferred, although not essential, the shaped cooked pellet prior to flaking is heating at a temperature of about 100° F. to 300° F. for a period of about 1 to 3 minutes. This heating step warms the inside of the pellet while the surface or case hardens. The pellet, while in the heated condition, is mechanically flaked through shredding rolls.

A critical feature of the present invention is the type of shredding rolls that are employed. While one of the shredding rolls may be smooth, it is required that at least one of the rolls must be corrugated. An example of suitable disclosed rolls is shown in the figures of the above mentioned Hale et al., Pat. No. 2,743,685. However, as disclosed in FIG. 2 of the patent, it is not necessary that the corrugated roll be also cross cut at the roll extremity. The shredding rolls may have corrugation, such as parallel or transverse to the roll travel directions. However, corrugation of the rolls parallel to the roll direction of travel is preferable. With a transverse direction of roll indentation, sticking of the wheat to the roll may take place under specific operating conditions and a coating on the roll having anti-stick properties, as teflon, may be necessary. The shredding rolls should be closely spaced to cause indentation on the flake, but should not totally sever the pressed pellets, since otherwise only shreds would form.

The rippled flakes of uneven thickness after formation are toasted and then dried. As an alternate procedure, the low temperature drying step may take place prior to toasting.

In the toasting operation, low velocity air is employed with elevated temperature to bring the desired brown color. A temperature within the range of 300° F. to 550° F. is generally employed in toasting for a period of about one to two minutes. However, since oven puffing is not needed, low velocity air is employed which velocity is below 100 to 150 feet per minute and more preferably is about 50 feet per minute or less. High velocity air with toasting temperatures results in puffing which is not necessary and undesirable in forming a flaked breakfast cereal resembling in eating characteristics a cereal in biscuit form as in the above mentioned Hale et al. patent. Unlike Hale et al., the cereal flakes in this invention do not require puffing, while the patentees teach that puffing during toasting is necessary. If any puffing occurs during toasting with low velocity air, it would be negligible, since essentially baking the cereal takes place.

A separate lower temperature drying operation in addition to toasting brings the final moisture content to a level between about 1.0 to 7.0%. The drying temperature is several hundred degrees lower than the toasting temperature. A moisture content of 1 to 7% in a cereal as wheat lends a range of textural properties when the cereal is eaten. At the lower range of about 1% moisture, the product will be dry and brittle. At the upper range of about 7%, with a substantially greater moisture content, increased chewiness will be introduced. The toasted and dried product with adjusted moisture content is cooled and packaged.

As mentioned previously, an optional step during processing and formation of the flake is the heating of the cooked pellet and shredding of the pellet while in heated condition. This additional step results in more twist and curl of the flake after shredding which carries into the final product. Additionally, the flake is of slightly lesser density at comparable moisture contents with somewhat more crispness in comparison to flakes prepared without heating immediately prior to shredding. The flakes of decreased density have less tendency to pack together during shipment, handling and storage.

For consumption, the flaked product is intended primarily to be eaten with milk, although this liquid is not required. For example, the flakes may be eaten directly as a snack item. When the flakes are mixed with milk, the interconnecting thin membrane of the flakes will dissolve in the milk to produce shreds of the cereal. Thus, in this way interconnecting threads of a biscuit would be duplicated. Generally speaking, the connecting membrane of the flake should dissolve in a period of less than about three minutes with an optimum time range downward to about one minute. The time of dissolving of the membrane will be dependent upon its thickness.

With decreasing membrane thickness, the dissolving time time of the membrane is reduced. The time necessary for the shred formation may be directly controlled by prior processing steps primarily with the flaking rolls.

The maximum thickness of the thin membrane will vary depending upon the cereal employed, since cereals will vary in their ability to wtihstand being dissolved in milk. In the case of wheat, it has been found that membrane thickness in the range of .003 to .10 inches is satisfactory and desirable.

To further disclose the innovative aspects of this invention, the following examples are provided:

EXAMPLE I

A source of ingredients in specific concentration was used as follows:

Whole wheat flour _____lbs__ 7
Salt _____oz__ 6
Water _____lbs__ 2

These ingredients were blended uniformly in a Hobart mixer. The composition was pelletized. The wheat-containing material was cooked in a pressure cooker at 20 p.s.i. for 22 minutes. The mix was cooled, repelletized through a die having 5/32 inch holes, and shredded. The shredding rolls were similar to the rolls disclosed in FIG. 2 of the Hale et al. Pat. 2,600,532, except the corrugated roll was not cross cut and the roll was spaced so as to indent and not cut the pressed pellet. The shredded flake produced had a corrugated shape of uneven thickness. The flake could be considered to be a series of shreds connected by a thin membrane. The shred portion of the flakes were measured and were found to have a thickness between .020 to .025 inches with a width of .020 to .025 inches. The connecting membrane had a measured thickness between .003 to .010 inches and a width of .020 to .047 inches. The flakes were toasted at a temperature of 420° F. with about a 100 ft./min. air velocity for a duration of 60 seconds. The flakes were dried at 225° F. to a moisture content of about 3%.

The product was tested by adding milk. The connecting membrane readily dissolved producing a series of distinct, separated shreds. The shredded product when eaten has the wheat texture, flavor and mouth feel of a biscuit of shredded wheat.

EXAMPLE II

The method of Example I was duplicated in all respects, except wheat berries were substituted for the whole wheat flour.

The above examples are illustrative of various preferred embodiments of the invention and are not intended to be limiting. For example, in place of wheat, other cereals may be employed, including corn, oats, rice and the like. Other embodiments will become readily apparent to one of ordinary skill in the art. For example, instead of flakes having parallel thicker portions connected by parallel thin membranes, the flake may have a random orientation of thick and thin sections. Therefore, the claims are considered to be determinative of the scope of the invention.

What is claimed is:

1. A process for making a cereal flake of nonuniform thickness from a cooked pellet of the cereal comprising mechanically pressing the cereal pellet to form a flake containing discrete and distinct sections of different thickness, and toasting said product without substantial puffing; said flake containing thin sections of a membrane capable of dissolving in milk in a period of up to three minutes.

2. The process of Claim 1 wherein the cereal is cooked prior to pellet formation.

3. The process of Claim 1 wherein the cereal is cooked after pellet formation.

4. The process of Claim 1 wherein after cooking, said pellet is subjected to a heating step at a temperature of about 100° F. to 300° F. for a period of about 1 to 3 minutes and thereafter said pellet in a heated condition is subjected to the mechanical pressing step.

5. The process of Claim 1 which the cereal is dried to a moisture content between about 1 to 7% after mechanically pressing.

6. The process of Claim 1 wherein said cereal comprises wheat.

7. The process of Claim 6 wherein the thickness of said membrane is up to .010 inches.

References Cited
UNITED STATES PATENTS

| | | | |
|---|---|---|---|
| 1,911,887 | 5/1933 | Fike _____ | 107—2 |
| 1,946,803 | 2/1934 | McKay _____ | 99—81 |
| 2,600,532 | 6/1952 | Hale et al. _____ | 99—81 |
| 2,701,200 | 2/1955 | Huber _____ | 99—81 |
| 3,054,677 | 9/1962 | Graham, Jr. et al. _____ | 99—82 |

RAYMOND N. JONES, Primary Examiner

U.S. Cl. X.R.
426—142, 457